Nov. 2, 1926.
M. W. POTTER
1,605,770
COMBINED BREAD RECEPTACLE AND SLICING PLATFORM
Filed May 15, 1925   2 Sheets-Sheet 1
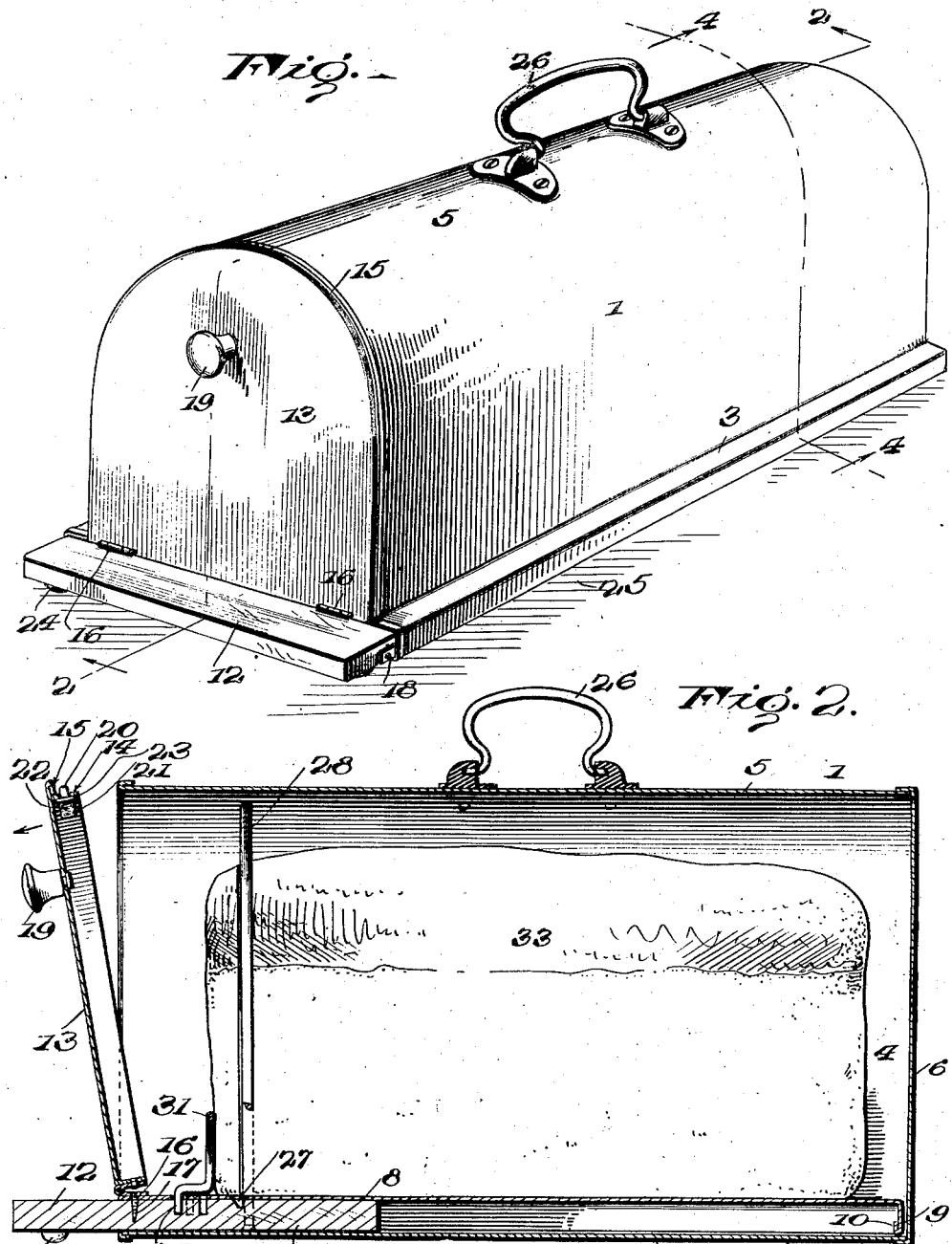
INVENTOR
Milton W. Potter.
BY
ATTORNEYS Nov. 2, 1926.
M. W. POTTER
1,605,770
COMBINED BREAD RECEPTACLE AND SLICING PLATFORM
Filed May 15, 1925      2 Sheets-Sheet 2
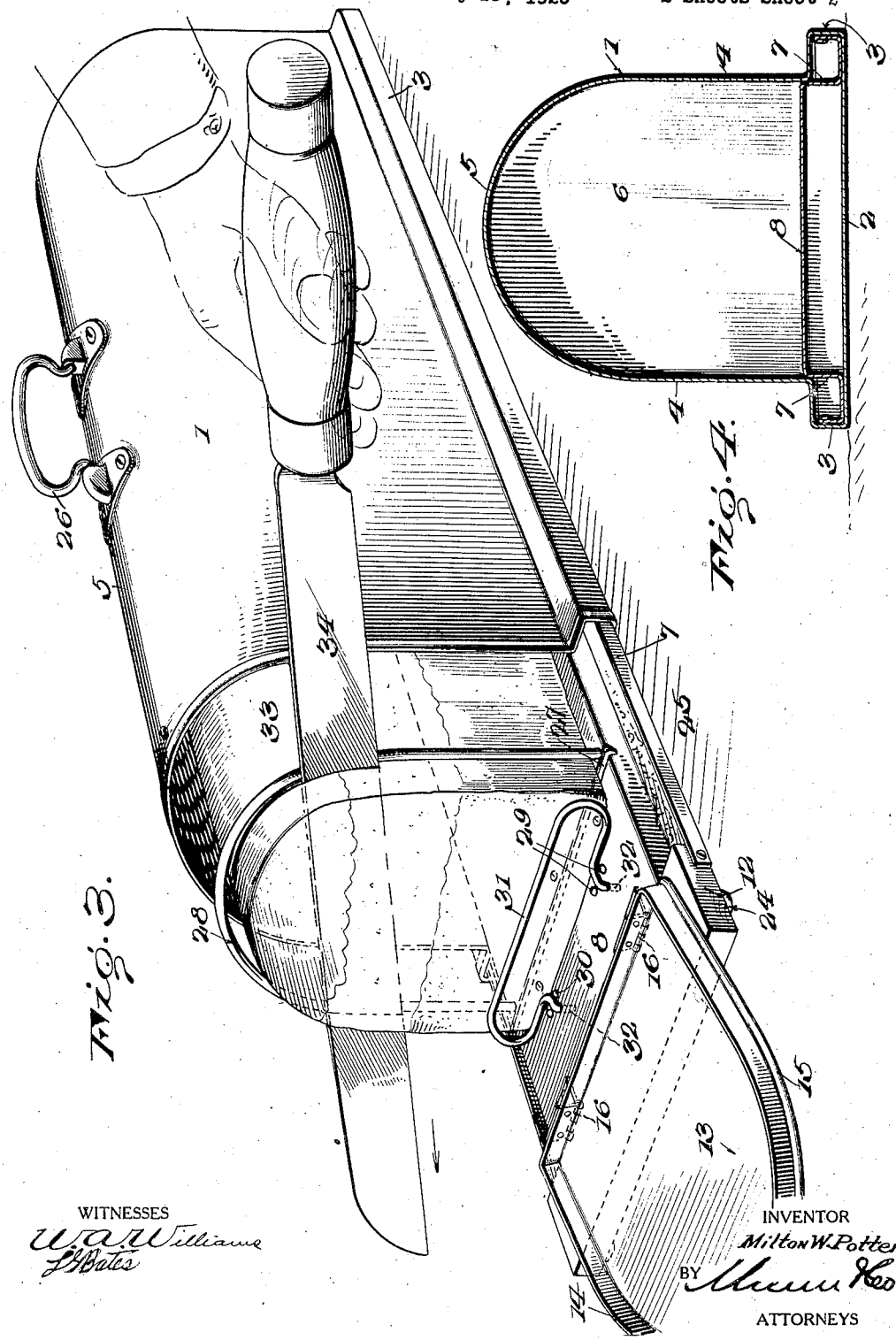
WITNESSES
INVENTOR
Milton W. Potter.
BY
ATTORNEYS Patented Nov. 2, 1926.

1,605,770

UNITED STATES PATENT OFFICE.

MILTON WILLIAM POTTER, OF SEATTLE, WASHINGTON.

COMBINED BREAD RECEPTACLE AND SLICING PLATFORM.

Application filed May 15, 1925. Serial No. 30,591.

My invention is a combined bread receptacle and slicing platform, and it consists in the combinations, constructions and arrangements herein described and claimed.

An object of the invention is the provision of a receptacle which is adapted when closed to house a loaf of bread, cake or the like, so that the loaf will be kept in good condition and which has associated therewith a platform capable of guided movement when a door of the receptacle is open to and from position within the receptacle, the platform being adapted to support the loaf so that slices of any one of a plurality of thicknesses can be severed from the loaf accurately, quickly and cleanly.

A further object of the invention is the provision of a device of the character described which includes a loaf supporting platform movable when the receptacle of the device is open to and from position within the receptacle and having means associated therewith for catching the crumbs which may be produced as a result of the slicing of the loaf on the platform.

A further object of the invention is the provision of a device of the character described which is economical to manufacture and thoroughly practical commercially.

Other objects and advantages of the invention will be apparent from the following description, considered in conjunction with the accompanying drawings, forming a part of this application, in which:

Fig. 1 is a perspective view of the combined bread receptacle and slicing platform with the platform retracted into the receptacle and the door of the receptacle closed;

Fig. 2 is a longitudinal vertical section through the device, showing a loaf of bread supported on the platform within the receptacle and the door of the receptacle slightly open, the section being taken substantially along the line 2—2 of Fig. 1;

Fig. 3 is a perspective view of the device with the platform partly extended, showing the loaf retained in position to be sliced and indicating the path of movement of a knife blade in severing a slice from the loaf; and Fig. 4 is a transverse vertical section through the device, substantially along the line 4—4 of Fig. 1.

The receptacle may be made of a light gauge metal or any other suitable material and comprises a hollow body 1 which preferably, although not necessarily, has the cross-sectional contour best seen in Fig. 4 and which includes a flat bottom 2 merged by a pair of channel shaped lateral extensions 3 into sides 4 which are joined integrally or otherwise to a transversely arched top 5. The body 1 is closed at one end by an end member 6 and is open at its opposite end. The channel shaped lateral extensions 3 are in open communication along their inner sides for the entire length thereof and constitute guideways in which a pair of channel shaped troughs 7 are longitudinally slidable.

The troughs 7 are joined integrally to a horizontal platform 8 at opposite side edges of the latter, the platform 8 being upwardly offset with respect to the bottoms of the guidways 3 so that the platform 8 will be supported slightly above the level of the upper walks or tops of channel guideways 3 when the bottom of the troughs rest flatwise upon the lower walls or bottoms of the channel guideways. The upper walls or tops of the channel guideways 3 may be considered as horizontally extending shoulders in body of the receptacle spaced from the bottom of the body of the receptacle for engaging with the upper edges of the channel shaped troughs 7 to retain the latter and the platform 8 against movement vertically in the receptacle when the bottoms of the troughs 7 are slidably supported on the bottom of the receptacle.

The troughs 7 and the platform 8 preferably are formed of a sheet of light gauge metal bent along longitudinal lines to have the cross-sectional configuration clearly shown in Fig. 4 and bent downwardly along a transverse line at one end of the sheet to provide the flange 9 which is turned inwardly and upwardly at its lower edge as indicated at 10 to provide a smooth contact surface in sliding contact with the bottom of the receptacle at the inner ends of the platform 8 and the troughs 7, the end portions of the flange 9 serving as closures for the inner ends of the troughs 7.

A flat stiffening and bracing member, which preferably is made of wood, has an inner end portion 11 which fits against the under face of the platform 8 between the troughs 7 and an outer end portion 12 which extends outward from the outer end of the platform 8 and laterally at the outer ends of the troughs 7 to produce closures for the outer ends of the troughs. The lower face of stiffening and bracing member 11—12 lies substantially flush with the bottoms of the troughs 7. A door 13 preferably is formed of sheet metal bent to provide a rim flange 14 which is adapted to fit snugly in the open end of the body of the receptacle between the platform 8 and the side and top walls of the body of the receptacle. The flange 14 may be merged into the body of the door by an outwardly turned marginal portion 15 of two lapped thicknesses of the metal sheet of which the door is formed, this outwardly turned marginal portion 15 constituting what may be termed a marginal bead for engaging with the adjacent end of the body of the receptacle to limit the inward movement of the flange 14 in the body of the receptacle when the door, which is secured at its lower edge by hinges 16 to the platform 8, is swung to closed position while the platform is in retracted position in the receptacle. Screws 17 which connect the hinges 16 with the platform 8 extend through the latter into the underlying stiffening and bracing member 11—12 for the platform and serve not only to secure the hinges firmly to the platform but also tend to prevent displacement of the stiffening and bracing member from a desirable position with respect to the platform. Obviously, other screws or like fastening devices, such as indicated at 18, may be employed to secure the platform 8 and troughs 7 securely to the stiffening and bracing member 11—12. The door may be provided with a knob 19. A latch pin 20, which extends through an opening in the flange 14 from a holder 21, is urged upward continuously by a spring 22 which is disposed in the holder between a head 23 on the pin and the bottom of the holder. The head 23 is larger than the opening in the flange 14 and prevents the pin from being projected completely from the holder while the spring 22 functions yieldingly to hold the pin extended sufficiently far to engage with the top of the body of the receptacle to tend to keep the door closed.

The outer end portion 12 of the stiffening and bracing member limits the downward swinging movement of the door from closed position and also is provided on its under surface with spaced rubber rest elements 24 which cooperate with the bottom of the receptacle to support the platform in horizontal position on a table 25 or like supporting surface when the platform has been extended from the receptacle.

A handle 26 may be secured on the top of the receptacle for convenience in moving the receptacle from place to place.

A transversely extending slot 27 is formed through the platform 8 and into the underlying portion of the stiffening and bracing member. This slot 27 extends transversely across the platform outwardly of the lower ends of the legs of an arched knife guide 28 which is of substantially inverted U-shape and which has the ends of the legs thereof fast in openings in the platform 8 and in the underlying portion 11 of the stiffening and bracing member. Spaced openings 29 are formed through the platform 8 and into the underlying stiffening and bracing member outwardly from the slot 27 and adjacent to one side edge of the platform, the respective openings 29 being different distances from the slot 27. Similar openings 30 are formed through the platform 8 into the underlying stiffening and bracing member adjacent to the opposite side edge of the patform. A stop 31 is made of a wire bent to have substantially C-shaped end portions, the end portions of the lower arms of which are bent laterally and then downwardly to provide offset attaching ends 32 which may be inserted in corresponding openings 29—30 to secure the stop detachably to the platform with the body of the stop in a plane located at a distance from the slot 27 which may be varied within limits by placing the attaching ends 32 of the stop in different pairs of corresponding openings 29—30.

From the foregoing description of the various parts of the device, the operation thereof may be readily understood. The platform with a loaf 33 of bread, cake or the like thereon may be retracted into the receptacle and the door of the receptacle closed, thus assuring the keeping of the loaf in good condition. The door may be opened when desired and the platform moved to extended position. The loaf is shoved through the arched guide 28 against the stop 31 which has been adjusted with respect to the slot 27 so that a slice of a predetermined thickness will be severed from the loaf when a knife blade 34 is slid downwardly through the loaf along the legs of the guide 28 into the slot 27. The provision of the slot 27 not only prevents contact of the cutting edge of the knife blade with metal at the end of the cutting stroke when the platform 8 is made of metal but assures a clean cut at the end of the cutting stroke, the cutting edge of the blade snapping through the crust at the bottom of the loaf into the slot 27 and obviating tearing or crushing of the crust at the end of the cutting stroke. Crumbs resulting from the shearing of slices of bread from the loaf will fall into the troughs 7 and may be disposed of as desired subsequently. The stop 31 or an equivalent thereof may be adjustably secured on the platform by the means hereinbefore described or by any other suitable known means, such as guide slots on the platform and lugs on the stop working in the slots.

Slices of any one of a plurality of different thicknesses therefore may be sliced accurately and quickly from the loaf.

Obviously, the invention is susceptible of embodiment in forms other than that which is illustrated in the accompanying drawings and I therefore consider as my own all such modifications and adaptations thereof as fairly fall within the scope of the appended claims.

I claim:

1. A device of the character described comprising a receptacle having a body open at one end, a platform slidable to and from position to be housed in the receptacle, and a trough carried by said platform at one side of the platform.

2. A device of the character described comprising a receptacle having a body open at one end, a platform slidable to and from position to be housed in the receptacle, a door for closing the open end of the body of the receptacle when the platform is retracted in the receptacle, said platform being adapted to support a loaf of bread or the like so that slices may be severed from the loaf, and troughs at the sides of the platform for catching crumbs produced when the loaf is sliced on the platform, said troughs being carried by the platform and the bottoms of the troughs being located below the level of the upper surface of said platform.

3. A device of the character described comprising a receptacle having a body open at one end, a platform slidable to and from position to be housed in the receptacle, a door for closing the open end of the body of the receptacle, when the platform is retracted in the receptacle, said platform being adapted to support a loaf of bread or the like so that slices may be severed from the loaf, troughs carried by the platform at the sides of the platform for catching crumbs produced when the loaf is sliced on the platform, the upper edges of said troughs being level with the upper face of said platform and horizontal shoulders on the side walls of said body of the receptacle for engaging with the upper edges of said troughs to hold said platform and troughs against vertical displacement in the receptacle and for covering said troughs when said platform is housed in the receptacle.

4. A device of the character described, comprising a receptacle having an elongated body open at one end and having a substantially flat bottom, the sides of said receptacle body having the lower portions thereof formed to produce a pair of outwardly turned longitudinally extending lateral substantially channel-shaped guides, said guides being open at their inner sides, a platform slidable on the flat bottom of the receptacle to and from position to be housed within the receptacle, and a pair of substantially U-shaped troughs carried by the platform at its opposite side edges in positions to slide longitudinally in said substantially channel-shaped guide portions of the receptacle body as said platform moves into and out of the receptacle.

5. In a device of the character described, a receptacle having a body open at one end and having a substantially flat bottom, a platform slidable on the bottom and spaced rest elements on the bottom face of the outer end portion of said platform for cooperating with the bottom of the receptacle to maintain the platform horizontal on a flat supporting surface when the platform is in extended position and for engaging with the edge of the bottom at the open end of the receptacle to limit the movement of the platform into the receptacle.

MILTON WILLIAM POTTER.